United States Patent
Wang et al.

(10) Patent No.: US 12,151,508 B2
(45) Date of Patent: Nov. 26, 2024

(54) AXLE ASSEMBLY HAVING A BRAKE DRUM AND METHOD OF ASSEMBLY

(71) Applicant: ArvinMeritor Technology, LLC, Troy, MI (US)

(72) Inventors: Chuntao Wang, Troy, MI (US); Tomaz Varela, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 734 days.

(21) Appl. No.: 17/335,324

(22) Filed: Jun. 1, 2021

(65) Prior Publication Data

US 2022/0379658 A1     Dec. 1, 2022

(51) Int. Cl.
| | | |
|---|---|---|
| B60B 11/02 | (2006.01) | |
| B60B 27/00 | (2006.01) | |
| B60K 17/04 | (2006.01) | |
| F16D 51/18 | (2006.01) | |

(52) U.S. Cl.
CPC ......... B60B 11/02 (2013.01); B60B 27/0057 (2013.01); *B60K 17/046* (2013.01); *F16D 51/18* (2013.01)

(58) Field of Classification Search
CPC ...... B60B 11/00; B60B 11/02; B60B 27/0057
See application file for complete search history.

(56) References Cited

U.S. PATENT DOCUMENTS

| | | | | |
|---|---|---|---|---|
| 2,099,833 A | * | 11/1937 | Van Halteren | F16D 65/10 188/218 R |
| 2,357,343 A | | 9/1944 | Morgan | |
| 2,389,339 A | * | 11/1945 | Ash | B60B 11/02 180/24.03 |
| 2,727,582 A | * | 12/1955 | Lisenby | B60B 11/02 180/24.03 |
| 4,214,792 A | * | 7/1980 | Hardwicke | B60B 11/02 301/36.1 |
| 8,747,271 B2 | * | 6/2014 | Vallejo | B60B 35/125 475/149 |
| 8,955,623 B2 | * | 2/2015 | Bittlingmaier | B60B 27/0052 180/370 |
| 9,677,628 B2 | | 6/2017 | Moss | |
| 10,052,913 B2 | * | 8/2018 | Sinka | B60B 27/02 |
| 2009/0102275 A1 | | 4/2009 | Rivera et al. | |
| 2012/0256474 A1 | * | 10/2012 | Gorle | B60B 37/00 301/105.1 |
| 2016/0053838 A1 | * | 2/2016 | Burgoon | F16D 65/0043 188/218 R |
| 2022/0049751 A1 | * | 2/2022 | Shah | F16D 65/22 |
| 2022/0371361 A1 | * | 11/2022 | Varela | B60B 27/0057 |

OTHER PUBLICATIONS

Extended European Search Report dated Nov. 2, 2022 for related European Appln. No. 22176608.2; 7 Pages.

* cited by examiner

*Primary Examiner* — Jason R Bellinger

(74) *Attorney, Agent, or Firm* — Brooks Kushman PC

(57) ABSTRACT

An axle assembly and a method of assembly. An outboard wheel is mounted to an outboard mounting arrangement of a wheel hub. An inboard wheel and a brake drum are mounted to an inboard mounting arrangement of the wheel hub such that a brake drum mounting arrangement of the brake drum is axially positioned between the inboard wheel and the inboard mounting arrangement.

20 Claims, 6 Drawing Sheets

Fig-2

AXLE ASSEMBLY HAVING A BRAKE DRUM AND METHOD OF ASSEMBLY

TECHNICAL FIELD

This relates to an axle assembly that has a brake drum and a method of assembly.

BACKGROUND

A wheel end assembly having a drum brake assembly is disclosed in U.S. patent publication no. 2022/0049751.

SUMMARY

In at least one embodiment an axle assembly is provided. The axle assembly includes a wheel hub, an outboard wheel, an inboard wheel, and a brake drum. The wheel hub is rotatable about an axis and has an outboard mounting arrangement and an inboard mounting arrangement. The outboard mounting arrangement extends away from the axis. The inboard mounting arrangement extends away from the axis and is spaced apart from the outboard mounting arrangement. The outboard wheel is mounted to the outboard mounting arrangement. The inboard wheel is spaced apart from the outboard wheel and is mounted to the inboard mounting arrangement. The brake drum is received inside the inboard wheel and has a brake drum mounting arrangement that is mounted to the inboard mounting arrangement such that the brake drum mounting arrangement is axially positioned between the inboard wheel and the inboard mounting arrangement.

In at least one embodiment a method of assembling an axle assembly is provided. The method includes providing a wheel hub that has a plurality of inboard and outboard mounting flanges that extend away from the axis. The outboard mounting flanges are spaced apart from the inboard mounting flanges. A brake drum has a plurality of brake drum mounting flanges that extend toward the axis. The brake drum mounting flanges are aligned with corresponding gaps between adjacent pairs of outboard mounting flanges and are then engaged with the inboard mounting flanges by moving the brake drum along the axis such that the brake drum mounting flanges pass through corresponding gaps between adjacent pairs of outboard mounting flanges.

BRIEF DESCRIPTION OF THE DRAWINGS

FIGS. 2 and 3 are exploded views of a portion of the axle assembly.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
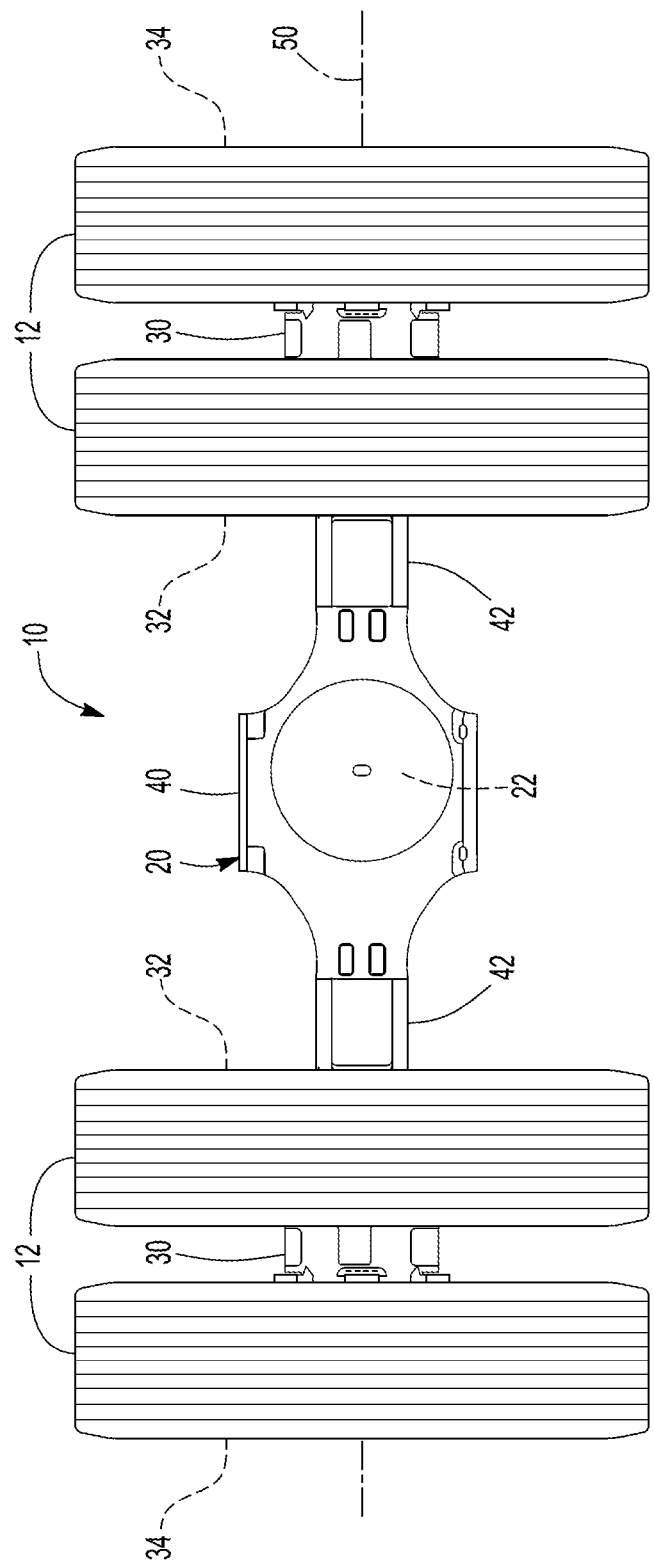
FIG. 1 is a perspective view of an example of an axle assembly.

Referring to FIG. 1, an example of an axle assembly 10 is shown. The axle assembly 10 may be provided with a vehicle like a truck, bus, farm equipment, mining equipment, military transport or weaponry vehicle, or cargo loading equipment for land, air, or marine vessels.

The axle assembly 10 may be part of a vehicle drivetrain that may transmit torque between at least one power source and a wheel assembly. The power source may be an electrical power source like an electric motor, a non-electrical power source like an internal combustion engine, or combinations thereof. A wheel assembly may include a tire 12 mounted on a wheel. Four wheel assemblies are illustrated in FIG. 1.

One or more axle assemblies 10 may be provided with the vehicle. For example, the axle assembly 10 may be a single drive axle assembly or may be configured as part of a tandem axle configuration or multi-axle configuration that may include a plurality of axle assemblies connected in series. As is best shown with reference to FIGS. 1 and 5, the axle assembly 10 may include a housing assembly 20, a differential assembly 22, at least one axle shaft 24, and at least one brake assembly 26. The axle assembly 10 may also include at least one wheel end assembly that may include a wheel hub 30, an inboard wheel 32, an outboard wheel 34, and a brake drum 36.

Referring to FIG. 1, the housing assembly 20 may receive various components of the axle assembly 10. In addition, the housing assembly 20 may facilitate mounting of the axle assembly 10 to the vehicle. The housing assembly 20 may have a center portion 40 that may receive the differential assembly 22. In addition, the housing assembly 20 may have a pair of arm portions 42 that extend from the center portion 40. Each arm portion 42 may support an axle shaft 24, a brake assembly 26, and a wheel end assembly.

The differential assembly 22 may be at least partially received inside the center portion 40 of the housing assembly 20. The differential assembly 22 may be rotatable about the axis 50 and may transmit torque to the axle shafts 24 and their associated wheels. The differential assembly 22 may be operatively connected to the axle shafts 24 and may permit the axle shafts 24 to rotate at different speeds in a manner known by those skilled in the art.

Figure 5:
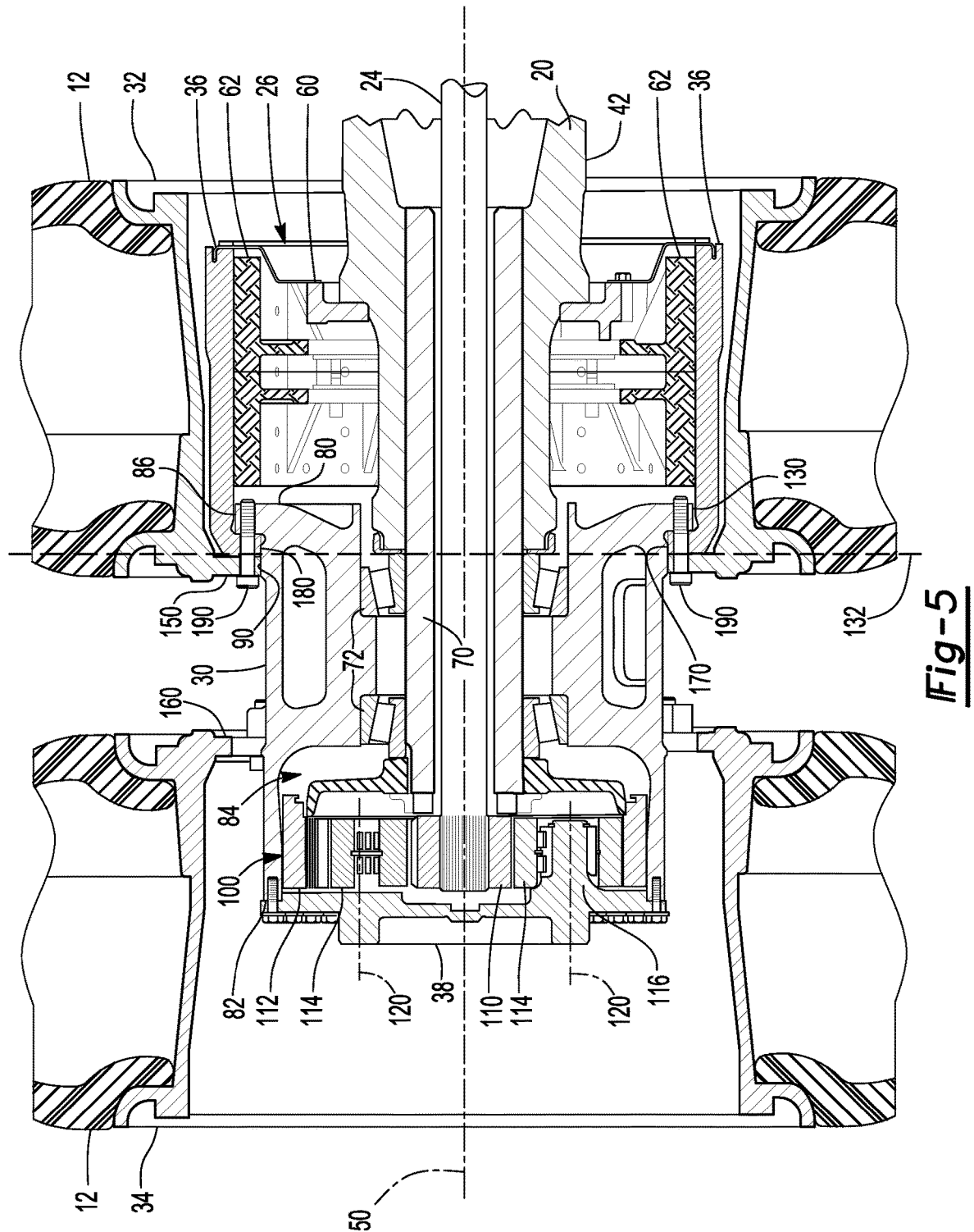
FIG. 5 is a section view along section line 5-5.

Referring to FIG. 5, an axle shaft 24 may transmit torque from the differential assembly 22 to a corresponding traction wheel assemblies. Two axle shafts 24 may be provided such that each axle shaft 24 extends through a different arm portion 42. The axle shafts 24 may extend along and may be rotatable about an axis, such as the axis 50. Each axle shaft 24 may have a first end and a second end. The first end may be operatively connected to the differential assembly 22. The second end may be disposed opposite the first end and may be operatively connected to a wheel hub 30.

Figure 2:
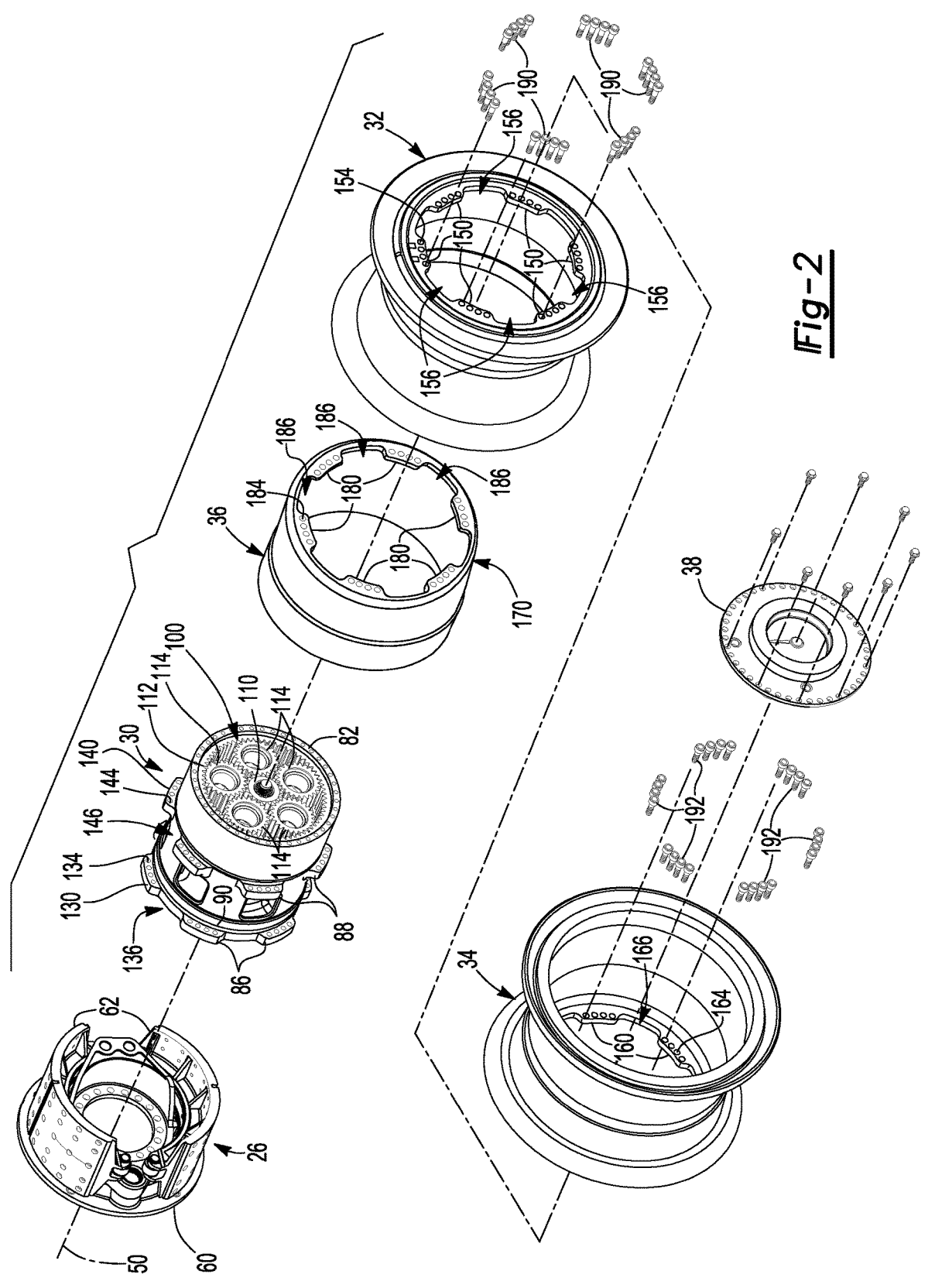
Figure 3:
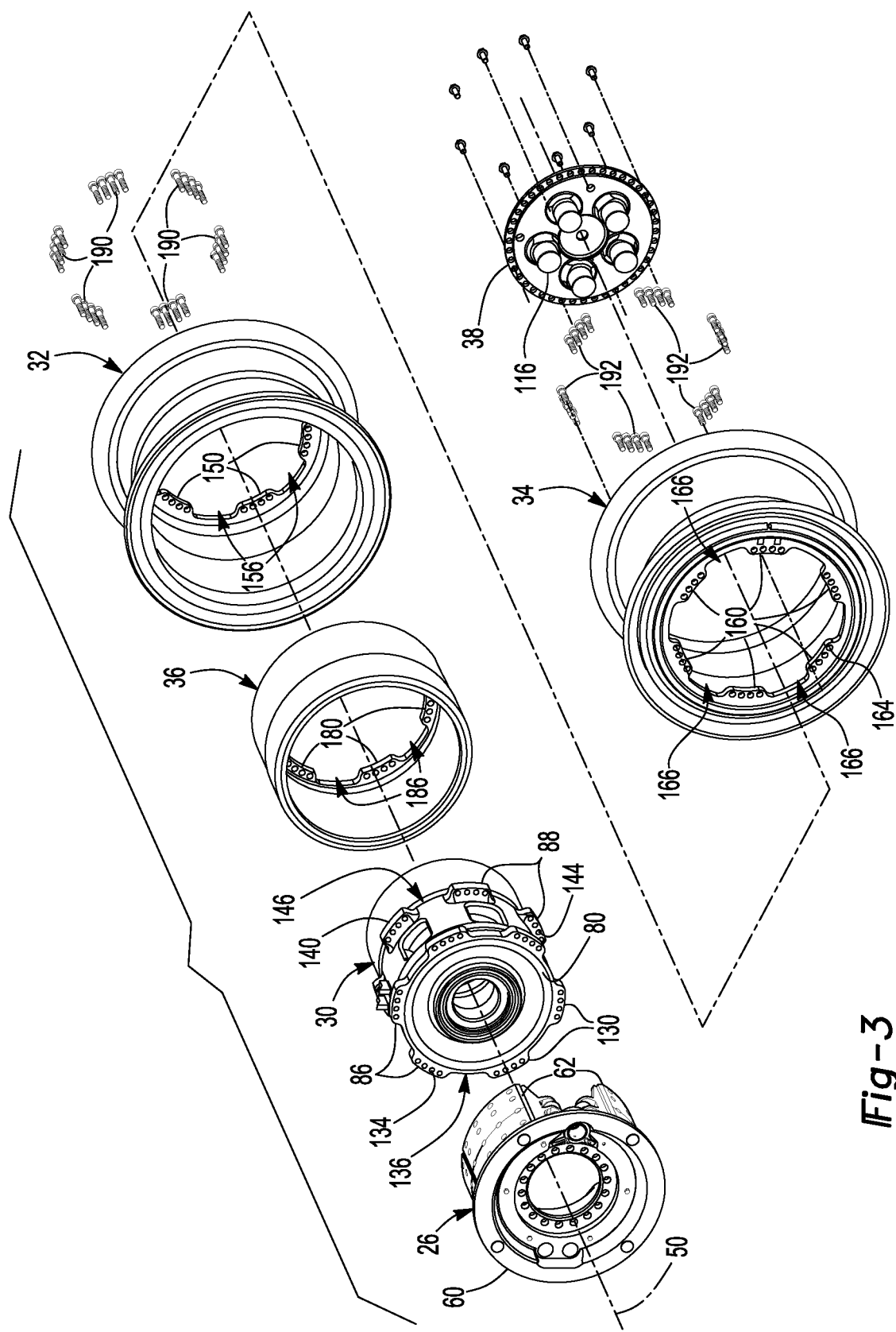
Figure 4:
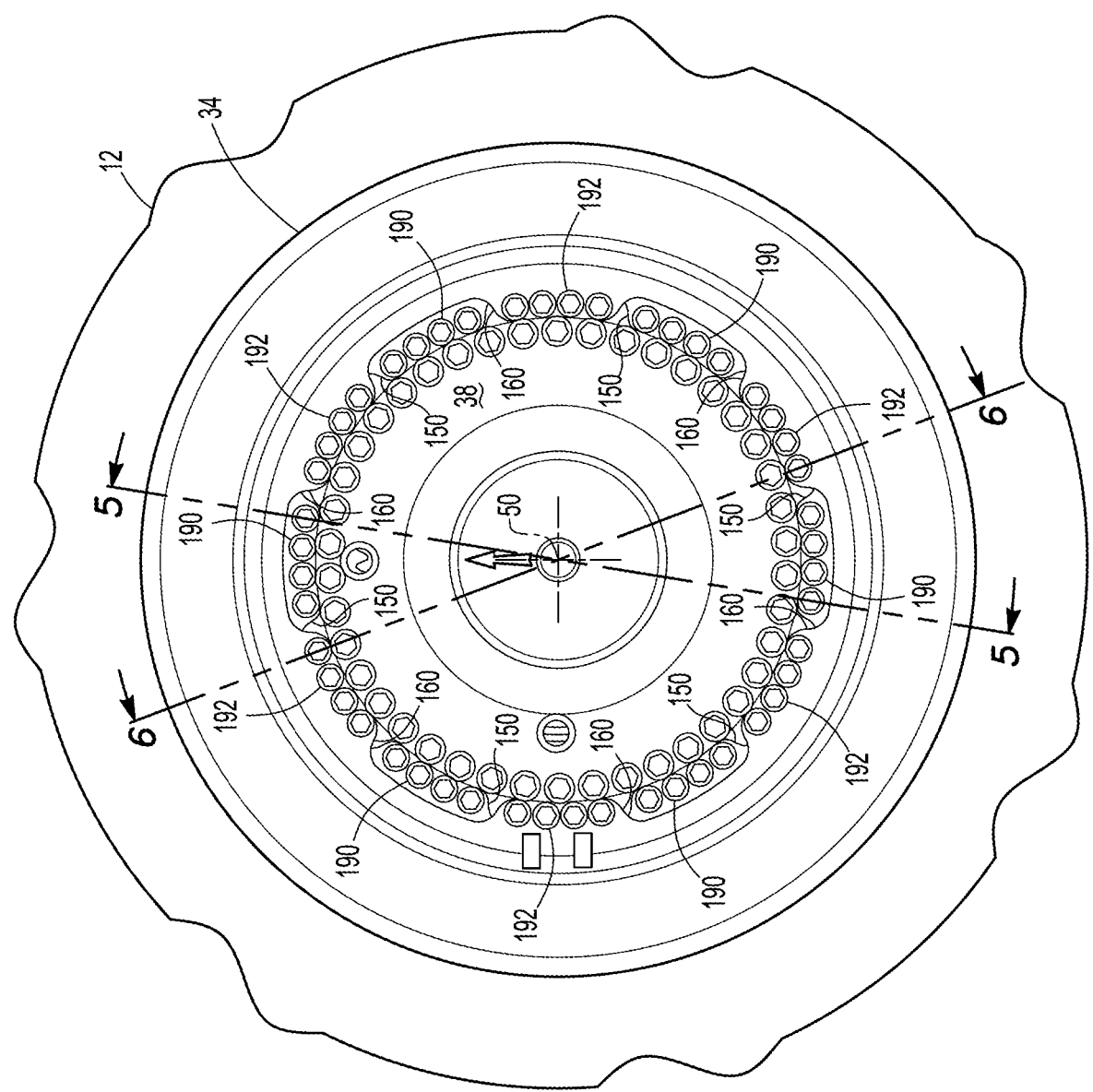
FIG. 4 is an end view of a portion of the axle assembly.

Referring to FIGS. 2, 3, and 5, the brake assembly 26 may be a friction brake that may be configured to slow or inhibit rotation of at least one associated wheel. In the configuration shown, the brake assembly 26 is configured as a drum brake and may include a brake spider 60 and one or more brake pad assemblies 62.

The brake spider 60 may facilitate mounting of the brake assembly 26 to an arm portion 42 of the housing assembly 20. In addition, the brake spider 60 may support various components of the brake assembly 26, such as a brake pad assembly 62.

One or more brake pad assemblies 62 may be moveable with respect to the brake spider 60. In the configuration shown, two brake pad assemblies 62 are depicted. A brake pad assembly 62 may be received inside and may be configured to engage the brake drum 36. For instance, the brake pad assembly 62 may include friction material that may be disposed on a brake shoe. The friction material may engage the inside of the brake drum 36 during vehicle braking and may be spaced apart from the brake drum 36 when friction braking is not applied.

The wheel hub 30 may be rotatable about an axis, such as the axis 50. As is best shown in FIG. 5, the wheel hub 30 may be rotatable about the axis 50 with respect to the arm portion 42 and a spindle 70 that may be provided with the arm portion 42. The wheel hub 30 may be rotatably supported by one or more wheel bearings 72 that may be disposed on the spindle 70. In at least one configuration and as is best shown with reference to FIGS. 2, 3, 5 and 6, the wheel hub 30 may include an inboard end 80, an outboard end 82, a hub cavity 84, an inboard mounting arrangement 86, an outboard mounting arrangement 88, and a guide ring 90.

Referring primarily to FIGS. 3 and 5, the inboard end 80 may face toward the brake assembly 26 or to the right from the perspective shown in FIG. 5.

Referring primarily to FIGS. 2 and 5, the outboard end 82 may be disposed opposite the inboard end 80. The outboard end 82 may face toward and may engage the hub cap 38. Alternatively, another component such as an axle shaft flange may engage the outboard end 82.

Referring primarily to FIG. 5, the hub cavity 84 may extend around the axis 50. The hub cavity 84 may receive various components that may be associated with the wheel end assembly, such as the spindle 70, wheel bearings 72, seals, and the like. The hub cavity 84 may also receive a gear reduction unit 100.

Referring to FIGS. 2 and 5, the gear reduction unit 100 may operatively connect the axle shaft 24 to the wheel hub 30 and may provide gear reduction between the axle shaft 24 and the wheel hub 30. The gear reduction unit 100 may have any suitable configuration. For instance, the gear reduction unit 100 may be configured as a planetary gear set or a bevel gear set. In the configuration shown, the gear reduction unit 100 may be configured as a planetary gear set that may include a sun gear 110, a planetary ring gear 112, at least one planet gear 114, and a planet gear carrier 116.

The sun gear 110 may be rotatable about the axis 50 with the axle shaft 24. The sun gear 110 may have a set of teeth that may be arranged around the axis 50 and may be configured to mate or mesh with corresponding teeth of the planet gears 114.

The planetary ring gear 112 may be configured as a ring that may extend around the axis 50. The planetary ring gear 112 may encircle the planet gears 114 and may have a set of teeth that may extend toward the axis 50 and may mate or mesh with teeth of the planet gears 114. In the configuration shown, the planetary ring gear 112 is fixedly positioned with respect to the spindle 70 and does not rotate about the axis 50.

At least one planet gear 114 may be rotatably disposed between the sun gear 110 and the planetary ring gear 112. Each planet gear 114 may be rotatable about a different planet gear axis 120. As is best shown in FIG. 5, each planet gear 114 may define a hole that may be disposed along the planet gear axis 120 and may have a set of teeth that face away from the planet gear axis 120.

The planet gear carrier 116 may support the planet gears 114. In the configuration shown, the hub cap 38 is the planet gear carrier 116 and is fixedly positioned with respect to the wheel hub 30 such that the wheel hub 30 and the planet gear carrier 116 are rotatable together about the axis 50. The planet gear carrier 116 may include a plurality of shafts or pins that may be received in the hole of a corresponding planet gear 114.

Referring primarily to FIGS. 2, 3, and 5, the inboard mounting arrangement 86 may facilitate mounting of the inboard wheel 32 and the brake drum 36. The inboard mounting arrangement 86 may extend away from the axis 50 and may be disposed closer to the inboard end 80 than to the outboard end 82. For instance, the inboard mounting arrangement 86 may extend from the inboard end 80 toward the outboard end 82. The inboard mounting arrangement 86 may include one or more inboard mounting flanges 130.

An inboard mounting flange 130 may protrude in a direction that extends away from the axis 50 from an exterior side of the wheel hub 30 that may be disposed opposite the hub cavity 84. In at least one configuration, a single inboard mounting flange 130 may be provided that may extend continuously or discontinuously around the axis 50. Providing a single inboard mounting flange 130 may help prevent rocks or contaminants from entering the cavity of the brake drum 36 and may help prevent unintended wear or damage to components of the brake assembly 26. Alternatively, a plurality of inboard mounting flanges 130 may be provided that may be spaced apart from each other and may be arranged around the axis 50. In the configuration shown, six inboard mounting flanges 130 are illustrated; however, it is contemplated that a greater or lesser number of inboard mounting flanges 130 may be provided. The inboard mounting flanges 130 may be coplanar. For example, the inboard mounting flange 130 or inboard mounting flanges 130 may be disposed in an inboard plane 132, which is best shown in FIG. 5. The inboard plane 132 may be disposed substantially perpendicular to the axis 50. The term "substantially perpendicular" is used herein to designate features or axes that are the same as or very close to perpendicular and includes features that are within ±2° of being perpendicular each other.

The inboard mounting flange 130 or each inboard mounting flange 130 may define at least one fastener hole 134. In the configuration shown, four fastener holes 134 are provided with each inboard mounting flange 130; however, it is contemplated that a greater or lesser number of fastener holes 134 may be provided. It is also contemplated that a single inboard mounting flange 130 may be provided that has groups or clusters of fastener holes 134 that are arranged like the fastener holes 134 shown in FIGS. 2 and 3. Each fastener hole 134 may be a through hole or a blind hole. In at least one configuration, one or more fastener holes 134 may be threaded.

Referring primarily to FIGS. 2 and 3, a gap 136 may be provided between adjacent pairs of inboard mounting flanges 130 when multiple inboard mounting flanges 130 are provided. The gap 136 may extend from one inboard mounting flange 130 to an adjacent inboard mounting flange 130 and may be disposed closer to the axis 50 than the exterior side or outer circumferential surface of the inboard mounting flanges 130 that may face away from the axis 50.

Figure 6:
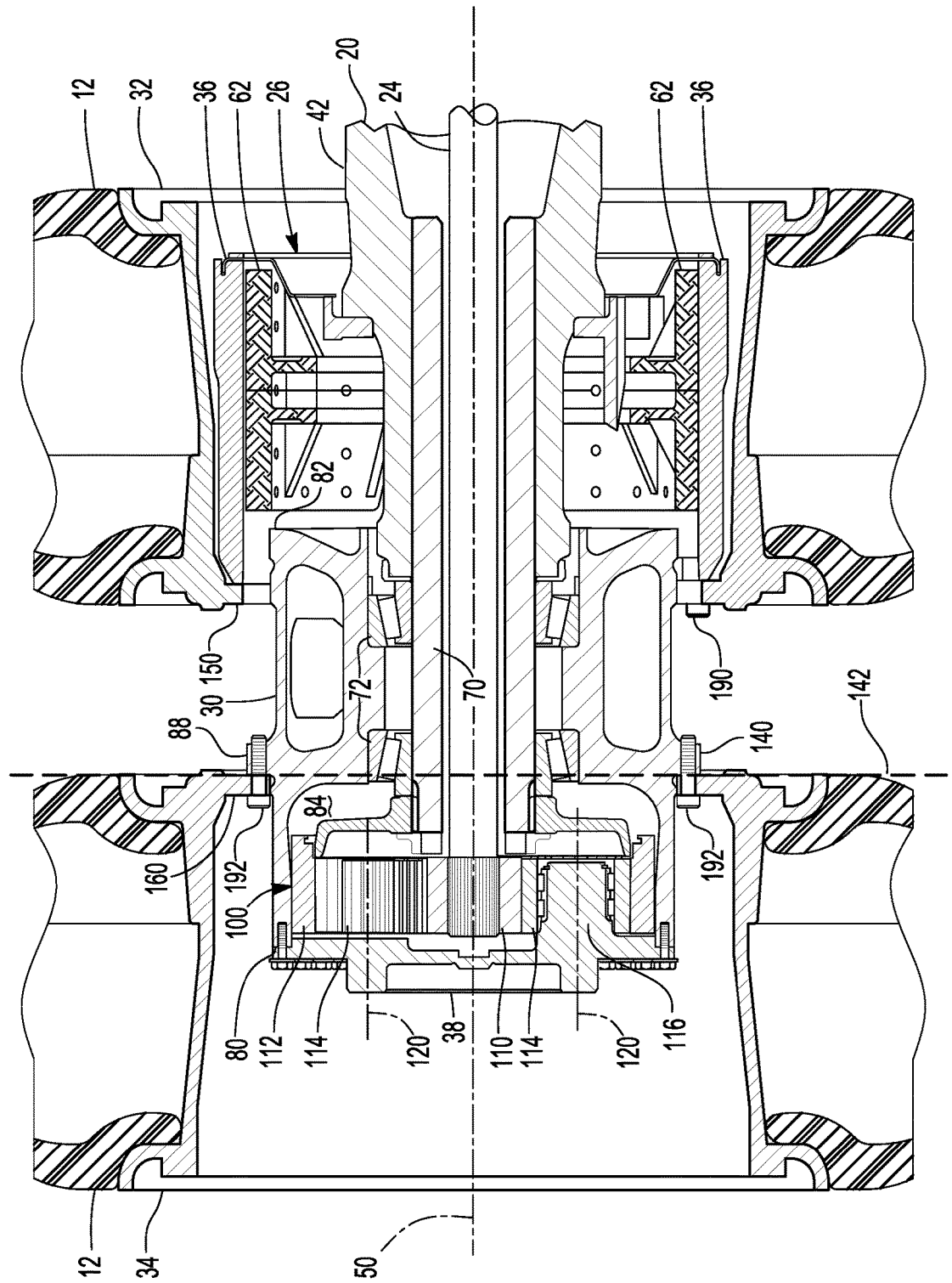
FIG. 6 is a section view along section line 6-6.

Referring primarily to FIGS. 2, 3, and 6, the outboard mounting arrangement 88 may facilitate mounting of the outboard wheel 34. The outboard mounting arrangement 88 may extend away from the axis 50 and may be spaced apart from the inboard mounting arrangement 86. The outboard mounting arrangement 88 may be axially positioned between the inboard end 80 and the outboard end 82. For instance, the outboard mounting arrangement 88 may be axially positioned between the outboard end 82 and the inboard mounting arrangement 86. The outboard mounting arrangement 88 may be disposed closer to the outboard end 82 than to the inboard end 80. The outboard mounting arrangement 88 may include a plurality of outboard mounting flanges 140.

An outboard mounting flange 140 may protrude in a direction that extends away from the axis 50 from an exterior side of the wheel hub 30. The outboard mounting flanges 140 may be spaced apart from each other and may be arranged around the axis 50. In the configuration shown, six outboard mounting flanges 140 are illustrated; however, it is contemplated that a greater or lesser number of outboard mounting flanges 140 may be provided. The outboard mounting flanges 140 may be coplanar. For example, the outboard mounting flanges 140 may be disposed in an outboard plane 142, which is best shown in FIG. 6. The outboard plane 142 may be disposed substantially perpendicular to the axis 50. The outboard plane 142 may be offset from the inboard plane 132.

Each outboard mounting flange 140 may define at least one fastener hole 144. In the configuration shown, four fastener holes 144 are provided with each outboard mounting flange 140; however, it is contemplated that a greater or lesser number of fastener holes 144 may be provided. Each fastener hole 144 may be a through hole where a blind hole. In at least one configuration, one or more fastener holes 144 may be threaded.

Referring primarily to FIGS. 2 and 3, a gap 146 may be provided between adjacent pairs of outboard mounting flanges 140. The gap 146 may extend from one outboard mounting flange 140 to an adjacent outboard mounting flange 140 and may be disposed closer to the axis 50 than the exterior side or outer circumferential surface of the outboard mounting flanges 140 that may face away from the axis 50. The gap 146 may be larger or wider than mounting flanges that may be provided with the inboard wheel 32 and the brake drum 36 as will be discussed in more detail below.

Referring to FIGS. 2 and 3, the inboard mounting flanges 130 and the outboard mounting flanges 140 may be positioned around the axis 50 at different angular positions with respect to each other. The inboard mounting flanges 130 may be positioned at different angular positions with respect to each other and the outboard mounting flanges 140 may be positioned at different rotational positions with respect to each other. Moreover, the inboard mounting flanges 130 may be positioned around the axis 50 at different angular positions or rotational positions with respect to the outboard mounting flanges 140 and thus may be angular offset. As such, each outboard mounting flange 140 may be aligned with a gap 136 between two adjacent inboard mounting flanges 130 while each inboard mounting flange 130 may be aligned with a gap 146 between two adjacent outboard mounting flanges 140.

Referring primarily to FIGS. 2 and 5, a guide ring 90 may optionally be provided with the wheel hub 30. The guide ring 90 may help align or position the inboard wheel 32 and the brake drum 36 with respect to the axis 50. The guide ring 90 may extend around the axis 50 and may protrude away from the axis 50 from the exterior side of the wheel hub 30. The guide ring 90 may be axially positioned between the inboard mounting arrangement 86 and the outboard mounting arrangement 88. As is best shown in FIG. 5, the inboard wheel 32, the brake drum 36, or both may engage the guide ring 90.

Referring primarily to FIG. 5, the inboard wheel 32 may support a tire 12. The inboard wheel 32 may be mounted to the inboard mounting arrangement 86. The inboard wheel 32 may encircle the brake drum 36 and may be separated from the inboard mounting arrangement 86 by the brake drum 36. As such, the inboard wheel 32 may be spaced apart from the inboard mounting arrangement 86 and may not contact the inboard mounting arrangement 86. In at least one configuration and as is best shown with reference to FIGS. 2 and 3, the inboard wheel 32 may include a plurality of inboard wheel mounting flanges 150.

The inboard wheel mounting flanges 150 may be disposed proximate an outboard end of the inboard wheel 32 that may be disposed closest to the outboard wheel 34. An inboard wheel mounting flange 150 may extend away from the tire 12 and toward the axis 50. The inboard wheel mounting flanges 150 may be spaced apart from each other and may be arranged around the axis 50. In the configuration shown, six inboard wheel mounting flanges 150 are illustrated; however, it is contemplated that a greater or lesser number of inboard wheel mounting flanges 150 may be provided. The inboard wheel mounting flanges 150 may be coplanar and may be disposed proximate or adjacent to the inboard plane 132 when the inboard wheel 32 is mounted to the wheel hub 30.

Each inboard wheel mounting flange 150 may define at least one fastener hole 154. In the configuration shown, four fastener holes 154 are provided with each inboard wheel mounting flange 150; however, it is contemplated that a greater or lesser number of fastener holes 154 may be provided. Each fastener hole 154 may be a through hole and may not be threaded.

Referring primarily to FIGS. 2 and 3, a gap 156 may be provided between adjacent pairs of inboard wheel mounting flanges 150. The gap 156 may extend from one inboard wheel mounting flange 150 to an adjacent inboard wheel mounting flange 150 and may extend farther from the axis 50 than the interior side or inner circumferential surface of the inboard wheel mounting flanges 150 that may face toward the axis 50. The gap 156 may be larger or wider than the outboard mounting flanges 140 of the wheel hub 30 such that an outboard mounting flange 140 may be fittable between a pair of adjacent inboard wheel mounting flanges 150.

Referring primarily to FIG. 6, the outboard wheel 34 may be spaced apart from the inboard wheel 32 and may support a different tire 12 than the inboard wheel 32. In at least one configuration, the inboard wheel 32 and the outboard wheel 34 may have the same configurations. The outboard wheel 34 may be mounted to the outboard mounting arrangement 88. For instance, the outboard wheel 34 may engage or contact the outboard mounting arrangement 88. In at least one configuration and as is best shown with reference to FIGS. 2 and 3, the outboard wheel 34 may include a plurality of outboard wheel mounting flanges 160.

The outboard wheel mounting flanges 160 may be disposed proximate an outboard end of the outboard wheel 34 that may face away from the inboard wheel 32. An outboard wheel mounting flange 160 may extend away from the tire 12 and toward the axis 50. The outboard wheel mounting flanges 160 may be spaced apart from each other and may be arranged around the axis 50. In the configuration shown, six outboard wheel mounting flanges 160 are illustrated; however, it is contemplated that a greater or lesser number of outboard wheel mounting flanges 160 may be provided. The outboard wheel mounting flanges 160 may be coplanar and may be disposed proximate or adjacent to the outboard plane 142 when the outboard wheel 34 is mounted to the wheel hub 30.

Each outboard wheel mounting flange 160 may define at least one fastener hole 164. In the configuration shown, four fastener holes 164 are provided with each outboard wheel mounting flange 160; however, it is contemplated that a greater or lesser number of fastener holes 164 may be provided. Each fastener hole 164 may be a through hole and may not be threaded.

Referring primarily to FIGS. 2 and 3, a gap 166 may be provided between adjacent pairs of outboard wheel mounting flanges 160 and in the same fashion as the gaps 156 that may be provided with the inboard wheel 32. It is also contemplated that the outboard wheel 34 may be provided with a different configuration than the inboard wheel 32 and may have a single outboard wheel mounting flange 160.

Referring primarily to FIGS. 2, 3, and 5, the brake drum 36 may be mounted to the wheel hub 30 such that the brake drum 36 may be rotatable about the axis 50 with the wheel hub 30. As is best shown in FIG. 5, the brake drum 36 may be received inside the inboard wheel 32 and may have a cylindrical portion that may extend continuously around the brake pad assemblies 62. The brake drum 36 may include a brake drum mounting arrangement 170.

The brake drum mounting arrangement 170 may be mounted to the inboard mounting arrangement 86 such that the brake drum mounting arrangement 170 is axially positioned between the inboard mounting arrangement 86 of the wheel hub 30 and the inboard wheel mounting flanges 150 of the inboard wheel 32. As such, the brake drum mounting arrangement 170 may engage the inboard mounting arrangement 86 and the inboard wheel mounting flanges 150. In at least one configuration and as is best shown with reference to FIGS. 2 and 3, the brake drum mounting arrangement 170 may include one or more brake drum mounting flanges 180.

The brake drum mounting flanges 180 may be disposed proximate an outboard end of the brake drum 36 that may be disposed closest to the outboard wheel 34. A brake drum mounting flange 180 may extend toward the axis 50. The brake drum mounting flanges 180 may be spaced apart from each other and may be arranged around the axis 50. In the configuration shown, six brake drum mounting flanges 180 are illustrated; however, it is contemplated that a greater or lesser number of brake drum mounting flanges 180 may be provided. The brake drum mounting flanges 180 may be coplanar. In at least one configuration, each brake drum mounting flange 180 may engage a different inboard mounting flange 130, a different inboard wheel mounting flange 150, or both. For instance, each brake drum mounting flange 180 may engage one inboard mounting flange 130 and one inboard wheel mounting flange 150.

Each the brake drum mounting flange 180 may define at least one fastener hole 184. In the configuration shown, four fastener holes 184 are provided with each brake drum mounting flange 180; however, it is contemplated that a greater or lesser number of fastener holes 184 may be provided. Each fastener hole 184 may be a through hole and may not be threaded.

Referring primarily to FIGS. 2 and 3, a gap 186 may be provided between adjacent pairs of brake drum mounting flanges 180. The gap 186 may extend from one brake drum mounting flange 180 to an adjacent brake drum mounting flange 180 and may be extend farther from the axis 50 than an interior side or inner circumferential surface of the brake drum mounting flanges 180 that may face toward the axis 50. The gap 186 may be larger or wider than the outboard mounting flanges 140 of the wheel hub 30 such that an outboard mounting flange 140 may be fittable between a pair of adjacent brake drum mounting flanges 180. Similarly, the gap 146 between adjacent pairs of outboard mounting flanges 140 may be larger or wider than the brake drum mounting flange 180 such that the brake drum mounting flanges 180 may be fittable between a pair of adjacent outboard mounting flanges 140. Each brake drum mounting flange 180 may engage a different inboard wheel mounting flange 150 of the inboard wheel 32.

Referring to FIGS. 2-5, a fastener 190, such as a bolt, may extend through a fastener hole 154 of the inboard wheel mounting flange 150, a fastener hole 184 of the brake drum mounting flange 180, and into the fastener hole 134 of the inboard mounting flange 130. For instance, a head of the fastener 190 may be disposed adjacent to the inboard wheel mounting flange 150 while the shank of the fastener 190 may be received inside the fastener holes 154, 184, 134 when the fastener holes 154, 184, 134 are aligned and the fastener 190 is installed.

Referring to FIGS. 2-4 and 6, a fastener 192, such as a bolt, may extend through a fastener hole 164 of the outboard wheel mounting flange 160 and into the fastener hole 144 of the outboard mounting flange 140. For instance, a head of the fastener 192 may be disposed adjacent to the outboard wheel mounting flange 160 while the shank of the fastener 192 may be received inside the fastener holes 164, 144 when the fastener holes 164, 144 are aligned and the fastener 192 is installed. The fasteners 190, 192 may have the same configurations.

A method of assembling an axle assembly 10 will now be described. The method will primarily be described starting with an assembled wheel hub 30 and an inboard wheel 32, an outboard wheel 34, and a brake drum 36 that are not yet assembled to the wheel hub 30.

First, the brake drum 36 may be aligned with the wheel hub 30 such that the opening of the brake drum 36 is generally centered about the axis 50 and the brake drum 36 is rotated about the axis 50 such that the brake drum mounting flanges 180 are aligned with corresponding gaps 146 between adjacent pairs of the outboard mounting flanges 140 of the wheel hub 30.

Next, the brake drum 36 may be moved along the axis 50 with respect to the wheel hub 30 in an inboard direction toward the inboard mounting arrangement 86. A brake drum mounting flange 180 may pass through a corresponding gap 146 and may pass between adjacent pairs of outboard mounting flanges 140. The brake drum 36 may be moved in the inboard direction until the brake drum mounting flanges 180 engage the inboard mounting flanges 130 of the inboard mounting arrangement 86.

Next, the inboard wheel 32 may be aligned with the wheel hub 30 such that the opening of the inboard wheel 32 is generally centered about the axis 50 and the inboard wheel 32 is rotated about the axis 50 such that the inboard wheel mounting flanges 150 are aligned with corresponding gaps 146 between adjacent pairs of the outboard mounting flanges 140 of the wheel hub 30.

The inboard wheel 32 may be moved along the axis 50 with respect to the wheel hub 30 in an inboard direction toward the inboard mounting arrangement 86 and the brake drum 36. An inboard wheel mounting flange 150 may pass through a corresponding gap 146 and may pass between adjacent pairs of outboard mounting flanges 140. The inboard wheel 32 may be moved in the inboard direction until the inboard wheel mounting flanges 150 engage the brake drum mounting flanges 180.

Fasteners 190 may be installed to secure the inboard wheel 32 and the brake drum 36 to the inboard mounting arrangement 86 of the wheel hub 30. It is also contemplated that the fasteners 190 may be installed or tightened after the outboard wheel 34 is installed.

Next, the outboard wheel 34 may be installed. The outboard wheel 34 may be aligned with the wheel hub 30 such that the opening of the outboard wheel 34 is generally centered about the axis 50 and the outboard wheel 34 is rotated about the axis 50 such that the outboard wheel mounting flanges 160 are aligned with the outboard mounting flanges 140 of the wheel hub 30. The outboard wheel 34 may be moved along the axis 50 with respect to the wheel hub 30 in an inboard direction toward the outboard mounting arrangement 88. The outboard wheel 34 may be moved in the inboard direction until the outboard wheel mounting flanges 160 engage the outboard mounting flanges 140.

Fasteners 192 may be installed to secure the outboard wheel 34 to the outboard mounting arrangement 88 of the wheel hub 30.

An axle assembly as described above may facilitate the mounting of multiple wheels, which may be easier to install and remove as compared to a wider and heavier single wheel that may support multiple tires. Providing separate wheels may allow associated load forces to be distributed to different mounting arrangements on the wheel hub, which in turn may permit smaller, less expensive fasteners to be used to secure the wheels. Such fasteners may be more compactly packaged, which may help increase the number of fasteners that may be provided. The wheels and brake drum may be removable from the wheel hub to provide improved access to the brake assembly, which may help reduce the time and cost required to replace the brake pad assemblies or perform other brake maintenance activities. Moreover, the wheels and brake drum may be installed on the wheel hub and removed from the wheel hub without disassembling the wheel hub or the gear reduction unit inside the wheel hub, which may reduce maintenance costs, maintenance time, and increase vehicle availability. An axle assembly as described above may allow a wheel hub to accommodate large planetary gear sets to help increase gear reduction capacity, which may be valuable in very large or very heavy vehicles, such as mining trucks. Moreover, the present invention may allow a brake drum to be mounted between a wheel and a mounting arrangement on the wheel hub, which may help improve the distribution and transmission of brake torque and associated load forces.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
    a wheel hub that is rotatable about an axis and that comprises an outboard mounting arrangement that extends away from the axis and an inboard mounting arrangement that extends away from the axis and is spaced apart from the outboard mounting arrangement, wherein the outboard mounting arrangement includes a plurality of outboard mounting flanges that are spaced apart from each other, arranged around the axis in an outboard plane, and extend away from the axis;
    an outboard wheel that is mounted to the outboard mounting arrangement;
    an inboard wheel that is spaced apart from the outboard wheel and that is mounted to the inboard mounting arrangement that comprises inboard wheel mounting flanges; and
    a brake drum that is received inside the inboard wheel and that comprises a brake drum mounting arrangement that is mounted to the inboard mounting arrangement such that the brake drum mounting arrangement is axially positioned between the inboard wheel and the inboard mounting arrangement, wherein the brake drum includes a plurality of brake drum mounting flanges that are spaced apart from each other and extend toward the axis, wherein a gap is provided between each adjacent pair of outboard mounting flanges that is larger than the brake drum mounting flange such that each brake drum mounting flange is fittable between a pair of adjacent outboard mounting flanges, and wherein the outboard mounting flanges are fittable between adjacent pairs of brake drum mounting flanges and are fittable between adjacent pairs of inboard wheel mounting flanges.

2. The axle assembly of claim 1 wherein the inboard wheel is spaced apart from and does not contact the inboard mounting arrangement.

3. The axle assembly of claim 1 wherein the wheel hub (Original) includes a guide ring that extends around the axis and that is axially positioned between the inboard mounting arrangement and the outboard mounting arrangement, wherein the inboard wheel and the brake drum engage the guide ring.

4. The axle assembly of claim 1 wherein the wheel hub has an inboard end that faces toward a brake assembly and an outboard end that is disposed opposite the inboard end, wherein the inboard mounting arrangement is disposed closer to the inboard end than the outboard mounting arrangement is disposed to the inboard end.

5. The axle assembly of claim 4 wherein the inboard mounting arrangement is disposed closer to the inboard end than to the outboard end and the outboard mounting arrangement is disposed closer to the outboard end than to the inboard end.

6. The axle assembly of claim 1 wherein the inboard mounting arrangement includes a plurality of inboard mounting flanges that are spaced apart from each other, arranged around the axis, and extend away from the axis.

7. The axle assembly of claim 6 wherein the inboard mounting flanges and the outboard mounting flanges are positioned around the axis at different angular positions with respect to each other.

8. The axle assembly of claim 1 wherein the inboard mounting arrangement includes a plurality of inboard mounting flanges that are spaced apart from each other, arranged around the axis in an inboard plane, and extend away from the axis.

9. An axle assembly comprising:
    a wheel hub that is rotatable about an axis and that comprises an outboard mounting arrangement that extends away from the axis and an inboard mounting arrangement that extends away from the axis and is spaced apart from the outboard mounting arrangement;
    an outboard wheel that is mounted to the outboard mounting arrangement;

an inboard wheel that is spaced apart from the outboard wheel and that is mounted to the inboard mounting arrangement; and a brake drum that is received inside the inboard wheel and that comprises a brake drum mounting arrangement that is mounted to the inboard mounting arrangement such that the brake drum mounting arrangement is axially positioned between the inboard wheel and the inboard mounting arrangement, wherein the brake drum mounting arrangement includes a plurality of brake drum mounting flanges that are spaced apart from each other, arranged around the axis, and extend toward the axis, wherein each brake drum mounting flange engages the inboard mounting arrangement, and wherein the inboard wheel includes a plurality of inboard wheel mounting flanges that are spaced apart from each other and extend toward the axis, wherein each inboard wheel mounting flange engages a different brake drum mounting flange.

10. The axle assembly of claim 1 wherein the inboard wheel mounting flanges are spaced apart from each other and extend toward the axis, wherein each inboard wheel mounting flange engages a different brake drum mounting flange.

11. The axle assembly of claim 10 wherein each brake drum mounting flange engages one inboard mounting flange of the inboard mounting arrangement and one inboard wheel mounting flange.

12. The axle assembly of claim 10 wherein each inboard mounting flange of the inboard mounting arrangement defines a fastener hole, each brake drum mounting flange defines a fastener hole, and each inboard wheel mounting flange defines a fastener hole, wherein the fastener hole in each inboard wheel mounting flange is aligned with one fastener hole in a corresponding brake drum mounting flange and one fastener hole in a corresponding inboard mounting flange.

13. The axle assembly of claim 12 wherein a fastener extends through aligned fastener holes of each inboard mounting flange, brake drum mounting flange, and inboard wheel mounting flange.

14. The axle assembly of claim 9 wherein the outboard mounting arrangement includes a plurality of outboard mounting flanges that are spaced apart from each other, arranged around the axis, and extend away from the axis.

15. The axle assembly of claim 14 wherein a gap is provided between each adjacent pair of outboard mounting flanges and each gap is larger than a corresponding brake drum mounting flange such that each brake drum mounting flange is fittable between a corresponding pair of adjacent outboard mounting flanges.

16. An axle assembly comprising:
a wheel hub that is rotatable about an axis and that comprises an outboard mounting arrangement that extends away from the axis and an inboard mounting arrangement that extends away from the axis and is spaced apart from the outboard mounting arrangement;
an outboard wheel that is mounted to the outboard mounting arrangement, wherein the outboard mounting arrangement includes a plurality of outboard mounting flanges that are spaced apart from each other, arranged around the axis in an outboard plane, and extend away from the axis;
an inboard wheel that is spaced apart from the outboard wheel and that is mounted to the inboard mounting arrangement, wherein the inboard wheel includes a plurality of inboard wheel mounting flanges that are spaced apart from each other and extend toward the axis; and a brake drum that is received inside the inboard wheel and that comprises a brake drum mounting arrangement that is mounted to the inboard mounting arrangement such that the brake drum mounting arrangement is axially positioned between the inboard wheel and the inboard mounting arrangement, wherein the brake drum includes a plurality of brake drum mounting flanges that are spaced apart from each other and extend toward the axis, wherein a gap is provided between each adjacent pair of outboard mounting flanges that is larger than the brake drum mounting flange, and wherein a gap is provided between each adjacent pair of inboard wheel mounting flanges that is larger than the outboard mounting flange, and wherein each brake drum mounting flange and each inboard wheel mounting flange is fittable between a pair of adjacent outboard mounting flanges.

17. The axle assembly of claim 16 wherein the outboard mounting flanges are fittable between adjacent pairs of brake drum mounting flanges and are fittable between adjacent pairs of inboard wheel mounting flanges.

18. A method of assembling an axle assembly comprising:
providing a wheel hub that has a plurality of inboard mounting flanges that extend away from an axis and a plurality of outboard mounting flanges that extend away from the axis and are spaced apart from the inboard mounting flanges;
aligning a brake drum that has a plurality of brake drum mounting flanges that extend toward the axis with the wheel hub such that the brake drum mounting flanges are aligned with corresponding gaps between adjacent pairs of outboard mounting flanges of the wheel hub; and
positioning the brake drum mounting flanges into engagement with the inboard mounting flanges by moving the brake drum along the axis with respect to the wheel hub such that each brake drum mounting flange passes through a corresponding gap between adjacent pairs of outboard mounting flanges.

19. The method of claim 18 further comprising:
aligning an inboard wheel that has a plurality of inboard wheel mounting flanges that extend toward the axis with the wheel hub such that the inboard wheel mounting flanges are aligned with corresponding gaps between adjacent pairs of outboard mounting flanges of the wheel hub;
positioning the inboard wheel mounting flanges into engagement with the brake drum mounting flanges; and
fastening the inboard wheel and the brake drum to the inboard mounting flanges.

20. The method of claim 19 further comprising mounting an outboard wheel to the outboard mounting flanges after positioning the inboard wheel mounting flanges into engagement with the brake drum mounting flanges.

\* \* \* \* \*